(12) United States Patent
Anheier et al.

(10) Patent No.: US 12,304,554 B2
(45) Date of Patent: May 20, 2025

(54) ROAD CONSTRUCTION MACHINE, IN PARTICULAR ROAD PAVER OR TANDEM ROLLER, FOR WORKING A GROUND IN A WORKING DIRECTION

(71) Applicant: BOMAG GmbH, Boppard (DE)

(72) Inventors: Thorsten Anheier, Boppard (DE);
Thomas Haubrich, Boppard (DE);
Thomas Klein, Boppard (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 18/638,753

(22) Filed: Apr. 18, 2024

(65) Prior Publication Data
US 2024/0351630 A1 Oct. 24, 2024

(30) Foreign Application Priority Data

Apr. 20, 2023 (DE) .......................... 102023203670.3
Mar. 22, 2024 (EP) ...................................... 24165626

(51) Int. Cl.
| | | |
|---|---|---|
| *B62D 1/187* | (2006.01) | |
| *B60N 2/06* | (2006.01) | |
| *B60N 2/14* | (2006.01) | |
| *E01C 19/26* | (2006.01) | |
| *E01C 19/48* | (2006.01) | |

(52) U.S. Cl.
CPC ............. *B62D 1/187* (2013.01); *B60N 2/062* (2013.01); *B60N 2/14* (2013.01); *E01C 19/26* (2013.01); *E01C 19/4873* (2013.01); *E01C 2301/30* (2013.01)

(58) Field of Classification Search
CPC . B62D 1/187; B62D 1/20; B62D 1/18; B60N 2/062; B60N 2/14; B60N 2/24; E01C 19/26; E01C 19/4873; E01C 2301/30; E01C 19/48
See application file for complete search history.

(56) References Cited

U.S. PATENT DOCUMENTS

| | | | | |
|---|---|---|---|---|
| 2,839,312 A | * | 6/1958 | Barenyi ................... | B62D 1/18 |
| | | | | 296/64 |
| 3,182,605 A | * | 5/1965 | Brasher ................... | B61C 17/04 |
| | | | | 280/77 |
| 3,347,558 A | * | 10/1967 | Grimes .................. | B60N 2/143 |
| | | | | 280/775 |

(Continued)

FOREIGN PATENT DOCUMENTS

| | | |
|---|---|---|
| DE | 2112972 A1 | 10/1971 |
| DE | 102010035270 B4 | 8/2013 |

(Continued)

OTHER PUBLICATIONS

European Patent Office, Search Report, Application No. 24165626.3, mailed Sep. 18, 2024 (11 pages).

(Continued)

*Primary Examiner* — Timothy Wilhelm
(74) *Attorney, Agent, or Firm* — Wood Herron & Evans LLP

(57) ABSTRACT

The invention relates to a road construction machine, in particular a road paver or a tandem roller, for working a ground in a forward direction with an operating device which can be displaced and swiveled.

14 Claims, 5 Drawing Sheets

(56) References Cited

U.S. PATENT DOCUMENTS

| | | | | |
|---|---|---|---|---|
| 3,799,569 | A * | 3/1974 | Baker | B62D 1/184 403/109.5 |
| 4,278,144 | A * | 7/1981 | Perin | B62D 49/0685 297/344.22 |
| 5,016,722 | A * | 5/1991 | Morita | B62D 1/18 56/14.7 |
| 5,346,035 | A * | 9/1994 | Ueda | F16H 59/02 180/326 |
| 5,664,909 | A * | 9/1997 | Lindgren | E01C 19/26 180/326 |
| 5,921,340 | A * | 7/1999 | Abels | B60N 2/38 180/326 |
| 6,086,142 | A * | 7/2000 | Simmons | B62D 33/0633 296/65.01 |
| 6,692,051 | B1 * | 2/2004 | Cook | B60N 2/24 296/24.39 |
| 6,814,174 | B2 * | 11/2004 | Fluent | B60N 2/797 297/344.22 |
| 6,857,498 | B2 * | 2/2005 | Vitale | B60K 35/10 180/326 |
| 6,863,305 | B2 * | 3/2005 | Hobaugh, II | B62D 1/184 280/775 |
| 7,159,687 | B2 * | 1/2007 | Dunn | B62D 33/0633 180/326 |
| 7,204,546 | B2 * | 4/2007 | Antonetti | B62D 33/0633 296/190.04 |
| 7,363,131 | B2 * | 4/2008 | Howell | B62D 1/18 701/1 |
| 7,434,863 | B2 * | 10/2008 | Hamazaki | B60N 2/146 297/344.21 |
| 7,540,685 | B2 * | 6/2009 | Avikainen | B62D 33/0636 180/327 |
| 7,681,687 | B2 * | 3/2010 | Stander | B60P 1/54 297/411.3 |
| 8,499,872 | B2 * | 8/2013 | Haubrich | E02F 9/166 180/89.13 |
| 8,590,983 | B2 * | 11/2013 | Berning | B62D 33/0636 299/39.4 |
| 9,073,460 | B2 * | 7/2015 | Herzberg | B60N 2/38 |
| 9,156,498 | B2 * | 10/2015 | Herzberg | F16C 29/045 |
| 9,783,056 | B2 * | 10/2017 | Klein | E02F 9/2004 |
| 10,233,599 | B2 * | 3/2019 | Muir | E01C 23/127 |
| 10,260,205 | B2 | 4/2019 | Laugwitz et al. | |
| 10,309,065 | B2 * | 6/2019 | Berg | E02D 3/032 |
| 10,391,983 | B2 * | 8/2019 | Klein | B60T 7/04 |
| 10,583,740 | B2 * | 3/2020 | Ory | B60K 35/10 |
| 10,742,967 | B2 * | 8/2020 | Hoggarth | B62D 1/046 |
| 10,960,938 | B2 * | 3/2021 | Doy | B62D 33/0636 |
| 11,001,315 | B2 * | 5/2021 | Johnson | E02F 9/16 |
| 11,040,670 | B2 * | 6/2021 | Carter | B60R 11/0235 |
| 11,110,821 | B2 * | 9/2021 | Luchner | B60K 37/00 |
| 11,292,504 | B2 * | 4/2022 | Palm | B60K 26/02 |
| 11,794,823 | B2 * | 10/2023 | Greenberg | B62D 33/077 |
| 11,993,318 | B1 * | 5/2024 | Lee | B60N 2/062 |
| 12,115,887 | B2 * | 10/2024 | Buschmann | B60N 2/502 |
| 2008/0203753 | A1 * | 8/2008 | Klein | B60N 2/005 296/65.13 |
| 2011/0236130 | A1 * | 9/2011 | Klein | B60N 2/797 297/344.21 |
| 2012/0048639 | A1 | 3/2012 | Haubrich et al. | |
| 2017/0001540 | A1 * | 1/2017 | Reif | B60N 2/0248 |
| 2017/0268181 | A1 | 9/2017 | Laugwitz et al. | |
| 2022/0219573 | A1 | 7/2022 | Buschmann et al. | |

FOREIGN PATENT DOCUMENTS

| | | |
|---|---|---|
| DE | 102017002225 A1 | 9/2017 |
| DE | 102018007825 A1 | 4/2020 |
| EP | 4029727 A1 | 7/2022 |
| FR | 2840871 B1 | 12/2004 |
| JP | 4876271 B2 | 2/2012 |

OTHER PUBLICATIONS

German Patent Office, Search Report, Application No. 10 2023 203 670.3, mailed Feb. 20, 2024 (11 pages).

* cited by examiner

ROAD CONSTRUCTION MACHINE, IN PARTICULAR ROAD PAVER OR TANDEM ROLLER, FOR WORKING A GROUND IN A WORKING DIRECTION

CROSS-REFERENCE TO RELATED APPLICATIONS

The present application claims priority under 35 U.S.C. § 119 of European Patent Application No. 24165626.3, Filed Mar. 22, 2024, and German Patent Application No. 10 2023 203 670.3, filed Apr. 20, 2023, the disclosures of which are hereby incorporated herein by reference in their entireties.

FIELD OF THE INVENTION

The present invention relates to a road construction machine, in particular a road paver or a tandem roller, for working a ground in a forward direction.

BACKGROUND OF THE INVENTION

Generic road construction machines are used, for example, in road and path construction, in the construction of squares and the like. A generic road construction machine usually has a machine frame, an operator platform, at least one travel unit and an operator station for entering steering commands. In the present context, a generic road construction machine is, in particular, a road paver or a tandem roller. A road paver also may comprise a material hopper positioned in front of the operator platform in the paving direction, several conveyors for longitudinally and transversely conveying paving material, travel units such as wheels or crawler tracks, and a paving screed. Tandem rollers usually have travel units in the form of so-called roller drums and/or rubber wheels. Tandem rollers may be pivot-steered or articulated. Such road construction machines are usually self-propelled road construction machines that have a drive motor, for example an internal combustion engine or an electric motor, via which the drive energy required to operate the road construction machine is provided. The main support structure of the road construction machine usually consists in the machine frame and a travel mechanism supporting the machine frame with at least one, in particular several, of the aforementioned travel units. The road construction machines are typically operated from an operator platform of the road construction machines. The operator platform has suitable operating devices for this purpose. It is also known to provide at least one operator seat on the operator platform from which the operator can operate the road construction machine from a sitting position. The operator platform may have at least one railing or an operator platform door.

Road pavers are used to apply or lay a material mat made of a paving material, usually in bulk, such as asphalt or concrete, onto a prepared underlying ground. For this purpose, they have a material hopper at their front end in which paving material is stored. This paving material is transported through a central duct to the rear of the machine and distributed there by a transverse distribution device, for example a screw conveyor, transversely to the forward direction. Finally, the paving material is leveled by a paving screed and precompacted. A typical road paver is disclosed, for example, in DE102017002225A1.

Tandem rollers, in turn, are usually used either to compact the underlying ground on which a top layer is to be placed, or to compact a layer of paving material, especially asphalt. For example, tandem rollers can be used in a paving train following a road paver in a paving direction and compacting the material mat, in particular asphalt mat, laid by the road paver. For this purpose, tandem rollers may, for example, have two compaction drums, which may essentially consist of hollow metal cylinders with which the tandem roller rolls on the ground to be compacted. In addition, at least one vibration exciter may be arranged in one or both of the compaction drums, which sets the compaction drum into vibration to thereby influence compaction. A typical tandem roller is disclosed, for example, in DE102018007825A1. One or both of the drums may also be designed as a rubber wheel set to provide a kneading effect to the ground material.

Generic road construction machines further comprise a steering wheel for inputting steering inputs by the operator sitting in the operator seat in order to be able to control the direction of movement of the road construction machine in a direction of travel during operation. Further, a support slide is provided on which both the operator seat and the steering wheel are arranged. It is known to provide a transverse guide, for example with at least one guide rail, along which the support slide can be displaced together with the operator seat and the steering wheel, usually in a horizontal direction transverse to the forward direction of the road construction machine. In generic road construction machines, the support slide is thus mounted on the transverse guide, in particular the at least one guide rail, so that it can be displaced together with the operator seat and the steering wheel along the at least one guide rail within an adjustment range, in particular linearly. In other words, it is known to configure the operator seat and the steering wheel to be displaceable together in a direction transverse to the forward direction of the road construction machine within the operator platform, for example from a position on a right-hand side to a position on a left-hand side with respect to a current forward direction and vice versa. Intermediate positions, such as a middle position, may also be possible. This makes it possible for the operator of such a machine to change his relative position within the road construction machine and, for example, to adapt it to specific environmental conditions, especially when working along a longitudinal edge. In the present context, a forward direction is understood to mean, in particular, a front/rear direction of the road construction machine. The forward direction is understood to be the forward direction toward the front of the road construction machine. In the case of a road paver, this is usually the side of the road construction machine on which the material hopper is located. In the case of a roller, this is usually a side specified by the design of the respective machine. The front may be located behind the transverse guide when viewed coming from the operator seat.

Such a support slide, which can be displaced horizontally and transversely to the working direction or forward direction of the road construction machine, with an operator seat and with a steering wheel is known, for example, from Applicant's patent DE 10 2010 035 270 B4. In addition to the one transverse guide with at least one guide rail, this patent also discloses a support slide which is movably mounted on the transverse guide such that, together with the operator seat and the steering wheel, it can be displaced along the transverse guide within an adjustment range between at least two different lateral end positions. Further provided is a steering input shaft device, specifically a steering input shaft, which is carried along when the support slide is displaced, and which is coupled to a steering output shaft arranged stationary on the road construction machine and running parallel to the guide rail. Stationary means that the steering input shaft is mounted in a defined position relative to the machine frame, but can be rotated about an axis of rotation running in axial direction of the steering input shaft. The steering output shaft is therefore not adjusted in the direction of the adjustment movement of the support slide when the support slide is simply displaced along the transverse guide. The steering output shaft can be connected and configured with a hydraulic valve or similar for forwarding the steering commands entered by the operator via the steering wheel to one or more steerable travel units of the road construction machine. The mechanical interface between the steering input shaft device and the steering output shaft is formed by a direction change transmission that mechanically transmits the steering movements applied to the steering wheel from the steering input shaft device to the steering output shaft, which direction change transmission is also carried along when the support slide is adjusted and is arranged axially displaceable relative to the steering output shaft for this purpose. Unlike the stationary steering output shaft, the direction change transmission can therefore be adjusted, in particular displaced, along the steering output shaft together with the steering input shaft device. In particular, the steering input shaft device is a mechanical, motion-transmitting connection between the steering wheel and the direction change transmission. The direction change transmission is functionally configured such that the direction of the torque transmission direction coming from the steering wheel or the respective axis of rotation is changed from the transmission input of the direction change transmission to the transmission output of the direction change transmission, in particular by an angle of approx. 90°.

The operations of generic road construction machines are diverse and complex. At the same time, the demands on the work result are constantly increasing. It is therefore becoming increasingly important that the operators of generic road construction machines are able to control them accurately and precisely, while maintaining as comprehensive an overview of the construction site situation as possible. It is therefore the task of the present invention to further improve the operator platform of a road construction machine as known from DE 10 2010 035 270 B4.

SUMMARY OF THE INVENTION

A generic road construction machine, in particular a road paver or a tandem roller, for working a ground in a forward direction comprises a machine frame, an operator platform, at least one travel unit and an operating device arranged on the operator platform. For further possible details of such a generic road construction machine, reference is also made to the preceding information on the prior art. In a generic road construction machine, the operating device further comprises an operator seat for an operator of the road construction machine and a steering wheel for inputting steering inputs by the operator, in particular when sitting on the operator seat. The road construction machine further has a support slide. This support slide is adjustably mounted on a transverse guide such that it can be displaced together with the operator seat and the steering wheel along the transverse guide within an adjustment range between at least two different lateral end positions. The lateral end position of the support slide relative to the transverse guide thus refers to a maximum displacement of the support slide on the transverse guide to one side and a maximum displacement to the side opposite along the transverse guide. It is also possible for the support slide to assume one or more intermediate positions between the two lateral end positions and/or to be continuously adjustable between the two end positions. The transverse guide is configured, in particular, such that the support slide can be displaced in a horizontal plane (in the case of a road construction machine standing on a horizontal plane) along a displacement axis running horizontally and transversely to the forward direction, such that the support slide and with it the operator seat and the steering wheel can be adjusted, for example, from a right-hand operating position to a left-hand operating position and vice versa. The transverse guide may have at least one guide rail, for example in the form of a guide tube, a guide bar or similar. The mounting of the support slide on the transverse guide may be such that the support slide itself can only be adjusted translationally along the transverse guide.

Further, a steering input shaft device is provided, which is carried along when the support slide is moved, and which is coupled to a steering output shaft arranged stationary on the road construction machine and running parallel to the guide rail. In functional terms, the steering input shaft device connects the steering wheel to the steering output shaft to transmit a steering torque or a steering turning movement generated manually on the steering wheel by the operator. The stationary mounting of the steering output shaft refers to an arrangement in which the position of the steering output shaft in the longitudinal direction or in the direction of its axis of rotation is defined by one or more suitable bearings and is fixed locally relative to the machine frame of the road construction machine, but at the same time it is possible to move the steering output shaft about the axis of rotation of the steering output shaft, which runs along the longitudinal axis of the steering output shaft.

Further, a direction change transmission is provided. The transmission mechanically transmits the steering movements applied to the steering wheel from the steering input shaft device to the steering output shaft and, in other words, represents the mechanical interface between these two devices. In particular, this may involve a change in the direction of transmission of the steering movement and/or a change in the direction of rotation of the transmitted steering movement. In particular, the direction change transmission may comprise at least one worm gear, as disclosed, for example, in DE 10 2010 035 270 B4, to which reference is hereby made. The direction change transmission is also carried along the transverse guide when the support slide is displaced and is axially displaceable relative to the steering output shaft for this purpose. To this end, for example, an output gear driven by a worm of a worm gear may have a passage opening with a polygonal opening cross-section profile, through which the steering output shaft extends, which in cross-section has a circumferential contour that is essentially complementary to the opening cross-section profile, so that the output gear can be displaced in the axial direction of the steering output shaft whereas in the direction of rotation about the axis of rotation extending in the axial direction a positive locking rotary stop is obtained. The steering input shaft device functionally connects the steering wheel with the direction change transmission and thus transmits steering movements provided by the operator via the steering wheel to the direction change transmission.

The steering output shaft may be connected, in particular on its end face, to, for example, a hydraulic steering valve, a steering mechanism, directly to a steering actuator, one or more sensors or the like, i.e., a device that further transmits the actuating movement of the steering output shaft triggered by the steering movement through the steering wheel on the output side of the steering output shaft. However, at least up to the output of the steering output shaft, the road construction machine according to the present invention has a steering device with the elements described above, in which steering inputs entered manually by the operator via the steering wheel are forwarded, then deflected and transmitted purely mechanically at least up to the output of the steering output shaft.

According to the present invention, an operator seat support device is further provided on the support slide, which is connected to the support slide via a joint device, in particular comprising at least one swivel joint, so as to be able to swivel about a swivel axis, in particular extending in the vertical direction, so that the operator seat and the steering wheel can swivel about this swivel axis relative to the support slide and thus also relative to the transverse guide. In addition to the ability to displace the support slide along the transverse guide, as described above, it is thus also possible to swivel the steering wheel and the operator seat relative to the transverse guide about the swivel axis by means of the operator seat support device, which is articulated to the support slide via the joint device. It is preferred if the road construction machine is configured such that the swivel axis and the displacement axis of the support slide and/or the axis of rotation of the steering output shaft are skewed relative to each other, but, in particular, if the two axes are projected into a common vertical reference plane aligned transversely to the forward direction, these two axes lie at right angles to each other. The axis of displacement of the support slide along the transverse guide and the axis of rotation of the steering output shaft, on the other hand, may be run parallel but not coaxial to each other. The support slide and its mounting may be such that the direction change transmission does not swivel relative to the transverse guide, but is only axially displaceable, as described above. The vertical direction refers to a direction perpendicular to the horizontal plane. Where reference is made in this application to a swivel axis extending in a vertical direction, this refers, in particular, to a road construction machine standing on a horizontal plane. It will be appreciated that this "vertical extension" of the swivel axis follows changes in the course of the ground surface, for example on sloping terrain.

In functional terms, the support slide therefore forms a bearing part that is directly connected to the transverse guide and can only be moved translationally along the transverse guide. In contrast, the operator seat support device on the one hand forms a support structure that is connected to the support slide via the joint device and can therefore swivel relative to the support slide about the swivel axis and displaced along the transverse guide together with the support slide. On the other hand, the support structure forms the overall structure on which the operator seat and the steering wheel are mounted and can therefore be adjusted together with the support structure. The operator seat and the steering wheel are, at least when locked on the support structure, stationary in relation to the support structure and are adjusted together with it, as described above. The weight force resulting from the operator sitting in the operator seat is thus initially absorbed by the operator seat support device, which in turn is swivel-mounted on the support slide, which in turn is mounted on the transverse guide, which absorbs at least a substantial part of the total weight force of these elements and the operator. Overall, this arrangement thus makes it possible for the operating device to have an additional degree of freedom of movement due to the possible swiveling of the operator seat and the steering wheel, in particular relative to the support slide, so that the operator can not only adjust the position of the operator seat along the transverse guide, but can also assume a position oriented at an angle to the forward direction by swiveling at least part of the operator seat support device on the support slide, and thus the operator seat. This may even mean that the operator seat can be swiveled out beyond an outer side wall of the road construction machine, giving the operator a particularly good view along one of the side walls of the road construction machine.

According to the present invention, the steering input shaft device further comprises a length compensation device. The latter is configured such that it compensates for changes in distance between the steering wheel or a steering wheel output and the direction change transmission input when the operating seat support device is swiveled relative to the support slide and relative to the transverse guide about the swivel axis, which runs, in particular, in the vertical direction. The length compensation device is therefore arranged, in particular, in the region between the steering wheel and the direction change transmission. Functionally, the length compensation device as part of the steering drive input device thus maintains a variability, in particular also of the longitudinal extension of the entirety of the steering input shaft device, which functionally acts as the steering input shaft, so that, while maintaining the fully mechanical transmission of steering commands of the transmission line from the steering wheel to at least the output of the steering output shaft, changes in the relative position of the steering wheel or of the steering wheel output to the direction change transmission or, in particular, to the direction change transmission input, which may occur due, for example, to the swiveling of the operator seat support device, are compensated. While maintaining an uninterrupted possibility for torque transmission by the length compensation device between the steering wheel or a steering wheel output and the direction change transmission or the direction change transmission input, different spatial relative positions of the steering wheel or the steering wheel output relative to the direction change transmission or the direction change transmission input, which may occur and be assumed, for example, upon swiveling of the operator seat support device relative to the support slide and thus the steering wheel about the, in particular vertical, swivel axis, can be compensated in this way, with the transmission mechanism automatically adapting to the changing relative positions of the mechanical transmission elements involved with the aid of the length compensation device. In terms of size, for example, the length compensation device may, for example, may be configured such that it enables axial length compensation in the direction of the at least local longitudinal axis in the range of at least 0.5 cm, more preferably of at least 1 cm.

The adjustments along the displacement axis and about the swivel axis are used, in particular, to adapt the perspective of the operator sitting in the operator seat to individual work situations or working environments and, for example, to adapt to changing conditions for one and the same driver. In particular, this also includes the option for an operator sitting in the operator seat to be able to view along the right or left side of the road construction machine from the respective operating position. The extent of the adjustment of the support slide along the displacement axis is therefore also preferably at least more than 50 cm, in particular more than 150 cm, transverse to the forward direction of the road construction machine and is not to be confused with a conventional seat adjustment to a small extent in or against the forward direction of the road construction machine for mere adaptation to individual body sizes of different operators.

Where the term "forward direction" is used herein, it refers to the direction of travel of the road construction machine, particularly in working operation. It will be appreciated that, especially for road construction machines such as road rollers, which frequently travel over the surface of the ground to be compacted in reversing operation with respect to the current working direction, the forward direction may alternate between a forward and a reverse direction. However, even for such road construction machines the forward direction refers to only one of the two possible working directions.

Working or processing the ground refers to the work function and working effect on the underlying ground as intended for the respective road construction machine. In the case of a road construction machine of the road paver type, this may, in particular, refer to the application of a material mat to an existing ground surface and, depending on the design of the paver screed used in the particular case, also the at least partial compaction and leveling of the applied material mat. For a road construction machine of the road roller type, the intended processing of the ground consists in a compaction effect on the underlying ground, which the road roller exerts on the underlying ground while traversing it, whether statically via its own weight or dynamically with, for example, one or more vibration excitation devices known from the prior art.

The road construction machine according to the present invention is self-propelled and thus moves in the forward direction under its own power. The road construction machine may have a suitable drive unit, for example an internal combustion engine and/or electric motor, to generate the drive energy required for working and traveling operation.

The bearing device between the transverse guide and the operator seat and the steering wheel is thus at least exclusively two-membered, comprising the operator seat support device configured as a support part, on which the operator seat and/or the steering wheel are arranged, and the support slide configured as a bearing part, which is swivel-mounted to the support part via the joint device and is mounted on the transverse guide.

The specific configuration of the joint device may vary. For example, it is possible that it comprises more than one individual joint, in particular exactly two individual joints, which are spaced apart from each other along the swivel axis, but whose individual joint axes run coaxially to the swivel axis. Even if there is a wide range of possible design variations here, it is preferred if at least one of these individual joints is located above the transverse guide and/or at least one of these individual joints is located below the steering output shaft when viewed vertically.

It is possible if the operator seat support device is configured such that it enables the steering wheel and the operating seat to swivel about the same swivel axis at the same time. Alternatively, the operator seat support device may also comprise a bearing part supporting the operator seat and a bearing part supporting the steering wheel, which can swivel independently of each other relative to the support slide, in which case it is advantageous if the operator seat and the steering wheel can swivel about coaxial swivel axes. Generally, however, it is advantageous if the relative position of the steering wheel to the operator seat remains unchanged in different displacement positions of the support slide, in particular generally when the support slide is displaced, and in different swivel positions of the operator seat support device relative to the support slide, in particular generally in different swivel positions.

The length compensation device may be configured in various ways to achieve the desired length compensation. Ideally, the length compensation takes place transverse to the direction of rotation of the steering input shaft device, in particular transverse to the direction of rotation of the steering input shaft device in the region in which the length compensation device is arranged, and transverse to the axis of rotation of the steering input shaft device which it has in the region of the length compensation device. At the same time, it is preferred if length compensation is possible and guaranteed in the various length compensation positions while maintaining the torque transmission function of the steering input shaft device from the steering wheel to the direction change transmission. For this purpose, the length compensation device is configured to co-rotate in the radial direction to the longitudinal axis of a length compensation region of the length compensation direction. For this purpose, the length compensation device may have two elements that can be adjusted relative to each other in the length compensation direction and are at the same time configured to co-rotate with each other in the direction of rotation about the adjustment axis of the length compensation device. For example, the steering input shaft device may have a telescopic shaft section, in particular one that is in itself co-rotating, or a telescopic device that can be adjusted within a compensation range. It may comprise a shaft sleeve and a shaft rod that engages or protrudes into the shaft sleeve, in particular so as to co-rotate about the longitudinal axis of the shaft sleeve. The shaft sleeve and the shaft rod may be configured to co-rotate with each other in the direction of rotation of the length compensation device, for example by means of one or more mechanical stops acting in the direction of rotation in an overlap area. To this end, for example, the shaft sleeve and the shaft rod may be configured with a non-circular cross-sectional profile transverse to the axis of rotation, for example polygonal, and complementary to each other at least in the overlap area. The elements that can be adjusted relative to one another in the direction of length compensation along a longitudinal axis, for example the shaft sleeve and the shaft rod engaging in the shaft sleeve, are thus axially displaceable relative to one another along the longitudinal axis within the length compensation range, but are configured for co-rotation, i.e., secured against rotation relative to each other, in the direction of rotation about the longitudinal axis, so that rotational movements about the longitudinal axis are transmitted between the shaft sleeve and the shaft rod independently of the current displacement position.

According to one aspect of the present invention, the steering input shaft device comprises a flexible or bendable shaft or at least one section with a bendable shaft. A flexible shaft is characterized by the fact that it allows significant bending movements, at least within a bending range, which are reversible and at the same time continue to allow torque transmission through the shaft. With the aid of such a flexible shaft, a mechanical connection and transmission of movement between the steering wheel and the direction change transmission can thus be established and maintained even if the steering wheel output axis and the direction change transmission input axis are not and/or no longer coaxially aligned with each other. This can occur, for example, if the operator seat support device is swiveled about the swivel axis relative to the transverse guide. The longitudinal axis of a flexible and partially bent shaft is then determined locally by the orientation of the axis of rotation at the respective center point. It is further preferred if the length compensation device is formed by a part or region of the steering input shaft device that does not have a flexible shaft. In other words, the flexible shaft that may be present is located outside the length compensation device.

Additionally or alternatively, in particular to compensate for a non-coaxial orientation of the steering wheel output axis to the direction change transmission output axis, the steering input shaft device may comprise a first universal joint, for example a direction change transmission universal joint, and a second universal joint, for example a steering wheel universal joint, which are arranged in series with one another, i.e., one behind the other or consecutively along the longitudinal axis or longitudinal extension of the steering input shaft device. With the aid of the two universal joints, it is possible to provide a universal shaft as part of the steering input shaft device in order to compensate for changing relative orientations of the steering wheel output axis to the direction change transmission input axis, particularly during operation, and at the same time to ensure torque transmission via the steering input shaft device.

In one embodiment of the present invention with a steering input shaft device with a first universal joint, for example a direction change transmission universal joint, and with a second universal joint, for example a steering wheel cardam joint, it is advantageous if the length compensation device is arranged between the first and the second universal joint, in particular in the direction of the longitudinal extension of the steering input shaft device or in the direction perpendicular to the direction of rotation of the steering input shaft device. This enables length compensation between the two joint units of the steering input shaft device, which can be advantageous from a spatial point of view, for example.

When the steering input shaft device is projected into a virtual horizontal reference plane, the first universal joint is located in front of the swivel axis, which extends, in particular, in the vertical direction, when viewed in the forward direction of the road construction machine, while the second universal joint is located behind this swivel axis when viewed in this forward direction of the road construction machine. This spatial relative position is particularly suitable for obtaining comparatively compact configurations of the steering input shaft device.

It is possible to configure the steering input shaft device such that, when the steering input shaft device is projected into a virtual horizontal reference plane, at least one of the two universal joints lies on the swivel axis. Alternatively, it is possible that in this projection the two universal joints are positioned without overlapping the swivel axis.

Additionally or alternatively, when the steering input shaft device is projected into a virtual horizontal reference plane, the steering output shaft and/or the guide rail of the transverse guide and/or the direction change transmission may be positioned in front of the first and second universal joints as viewed in a forward direction of the road construction machine. This can also enable comparatively compact configurations of the steering input shaft device.

If the first universal joint, in particular the direction change transmission universal joint, is configured and mounted on the direction change transmission such that it or at least the hinge point formed by the first universal joint at which the two longitudinal axes of the steering axle elements articulated to one another by the universal joint intersect, is stationary relative to the direction change transmission, in particular relative to a housing of the direction change transmission. When the steering wheel or the operator seat support device swivels, the first universal joint or its hinge point therefore does not change its relative position to the direction change transmission or to its direction change transmission housing. Furthermore, if the second universal joint, in particular the steering wheel universal joint, is configured and mounted such that it, or at least the hinge point formed by it in which the two longitudinal axes of the steering axle elements articulated to one another by the universal joint intersect, can be moved or is moved within a plane extending at an angle and, in particular, perpendicular to the swivel axis when the steering wheel is swiveled about the swivel axis of the operator seat support device.

According to another embodiment of the present invention, the direction change transmission may comprise an input shaft rotatable about an input shaft axis with a direction change transmission input axis, the drive end of which is connected, in particular directly, to the first universal joint. In particular, it is also possible for the direction change transmission to already include at least part of the first universal joint as a functional and structural module. It is further preferred if the first and second universal joints are mechanically connected to one another by a connecting shaft rotating about a connecting shaft axis. In particular, the connecting shaft may include the length compensation device along the longitudinal shaft axis. In addition, it may be advantageous if the steering wheel is connected to the second universal joint via a steering shaft rotating about a steering shaft axis or steering wheel output axis. It is also possible for the steering wheel or a steering wheel module comprising the steering wheel to already comprise at least part of the second universal joint as a functional and structural module. Together with the steering wheel itself, the steering shaft may form a coherent, rigid module.

The axes of rotation of the individual elements of the steering input shaft device may be located along the extension of the swivel axis and/or intersect it when the steering input shaft device is projected into a virtual vertical reference plane extending in the longitudinal direction of the transverse guide. However, the present invention also includes embodiments in which these axes of rotation run alongside the swivel axis in this projection.

In order to further increase the operating comfort for the operator of the road construction machine, it is advantageous if the operator seat support device comprises an adjustment device configured such that the angle of a steering wheel plane relative to the swivel axis or the inclination of the steering wheel is adjustable about an inclination axis. The adjustment device may additionally also have a suitable locking device to lock the steering wheel in a set inclination desired by the operator, in particular relative to the operator seat support device. However, this locking device does not simultaneously fix the steering wheel about the aforementioned swivel axis, in particular in the vertical direction, but only on the operator seat support device about an inclination axis, in particular a horizontal axis, in various positions, in particular positions that can be manually selected by the operator. The adjustment range of this adjustment device in a virtual projection plane, which runs transversely to the longitudinal extension of the transverse guide and in the vertical direction, is preferably at least 15°, preferably at least 25°.

It is particularly preferred in this case if this adjustment device and the steering input shaft device are configured such that the steering shaft can also be locked in a position in which it is positioned coaxially to the axis of rotation of the input shaft with respect to its axis of rotation. This can also enable a comparatively compact overall configuration of the steering input shaft device.

In particular, the adjustment device can be configured such that the, preferably horizontal, inclination axis about which the steering wheel can be adjusted independently of the swivel axis, runs through one of the universal joints. In this way, it is possible to ensure that no length compensation within the steering input shaft device is required to adjust an inclination of the steering wheel.

It is ideal if the swivel angle of the operator seat support device with the operator seat and the steering wheel about the swivel axis, in particular in the vertical direction, relative to the support slide between two maximum end positions is at least 90°, in particular at least 120°, and/or a maximum of 180°, in particular a maximum of 160°. This makes it possible, for example, for an operator sitting in the operator seat on the operator platform to swivel out of the platform at least partially and practically sit outside the remaining part of the machine and look along an outer side wall of the road construction machine comparatively comfortably. This can enable comparatively precise maneuvering of the road construction machine along obstacles running in the forward direction, such as a curb.

The operating device may comprise one or more locking devices, in particular manually releasable and lockable locking devices. One of these locking devices may be configured such that it locks and releases the support slide with regard to its movability along the transverse guide. Additionally or alternatively, a locking device may be provided which is configured such that it locks and releases the operator seat support device with respect to its swiveling about the swivel axis relative to the support slide and thus also relative to the transverse guide. These locking devices are preferably manually operated.

One or more of the above-mentioned locking devices may be configured such that they allow incremental or stepless adjustability within an adjustment range between the two maximum end positions limiting the respective adjustment range. Additionally or alternatively, one or more sensors may be provided to determine the position or to determine whether one or more specific positions have been assumed, for example a defined, in particular maximum, end position or the like. Further additionally or alternatively, one or more drive devices, such as a drive motor, in particular an electric or hydraulic motor, and/or an actuator, may also be included, which are configured and arranged for the motorized drive of the respective actuating movement within the respective actuating range.

In addition, the steering input shaft device may comprise a telescopic device which is configured such that the steering wheel 11 can be adjusted along the axis A1, in other words it is practically height-adjustable. However, this height adjustment is independent of the swivel and displacement position of the operating device and, in particular, also independent of the current relative position of the support slide relative to the operator seat support device. It is particularly preferred if the telescopic device is formed in the region between the steering wheel and the second universal joint, i.e., in the region of the steering input shaft device that rotates about the steering shaft axis. In this embodiment, the steering shaft input device thus comprises two devices arranged in series with one another, which enable adjustment in the longitudinal direction of the steering input shaft device. However, these are functionally independent of each other. A height adjustment of the steering wheel using the telescopic device does not change the relative position of the support slide relative to the operator seat support device or the condition of the length compensation device. Conversely, a change in the relative position of the support slide relative to the operator seat support device affects the length compensation device or its condition, but not the telescopic device and/or the current height position of the steering wheel.

In addition to the increased variability of the relative position of the operator seat relative to the transverse guide described above, the present invention allows the position of the swivel axis relative to the position of the displacement axis of the transverse guide to be almost freely selected and thus individually adapted to a wide variety of conditions of the respective road construction machine. These two axes may be skewed to each other. However, it is also possible for them to intersect and/or run completely in a common plane.

BRIEF DESCRIPTION OF THE DRAWINGS

The present invention will be described in more detail below by reference to the embodiment examples shown in the figures. In the schematic figures.

Like parts or functionally like parts are designated by like reference numerals in the figures. Recurring parts are not designated separately in each figure.

DETAILED DESCRIPTION OF THE INVENTION

Figure 1:
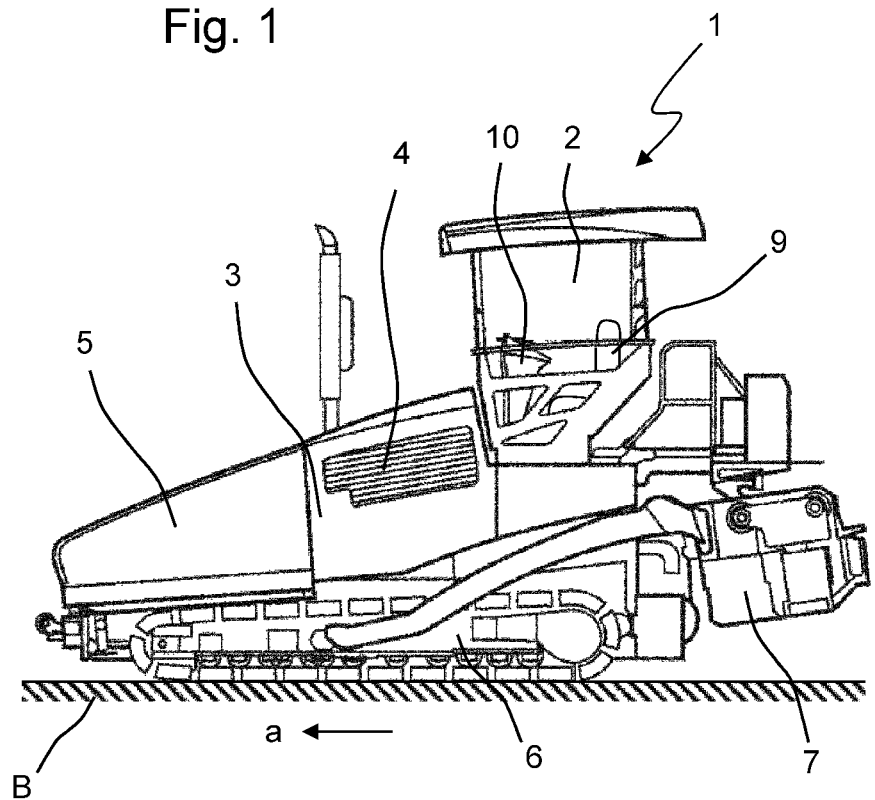
FIG. 1 is a side view of a road construction machine of the road paver type.
Figure 2:
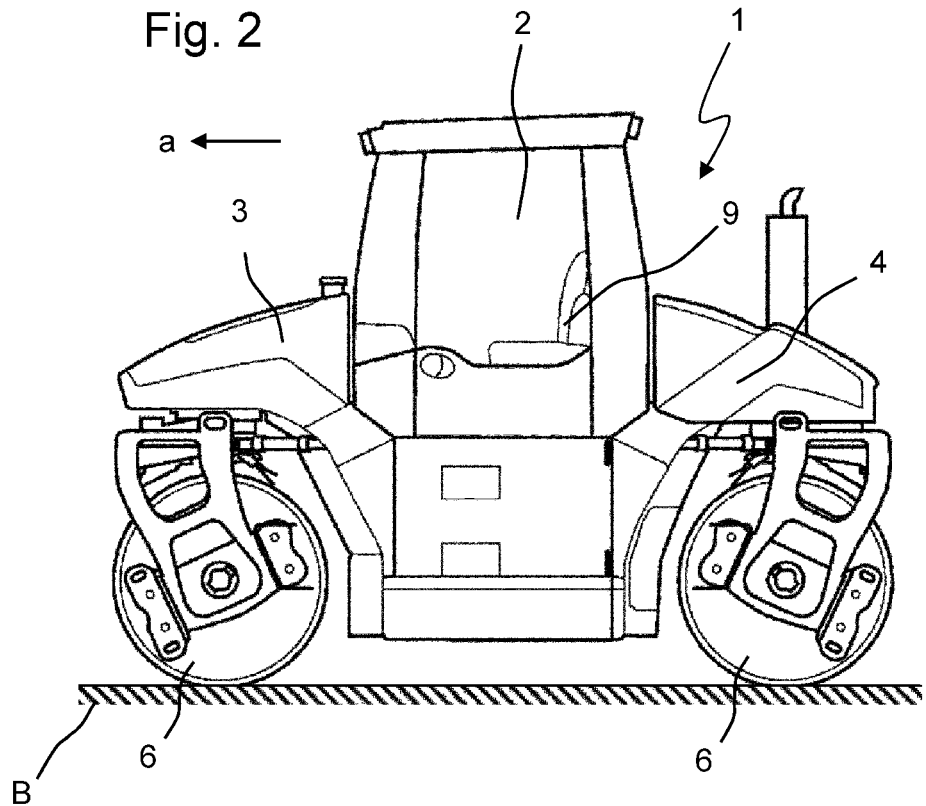
FIG. 2 is a side view of a road construction machine of the road roller type.
Figure 3:
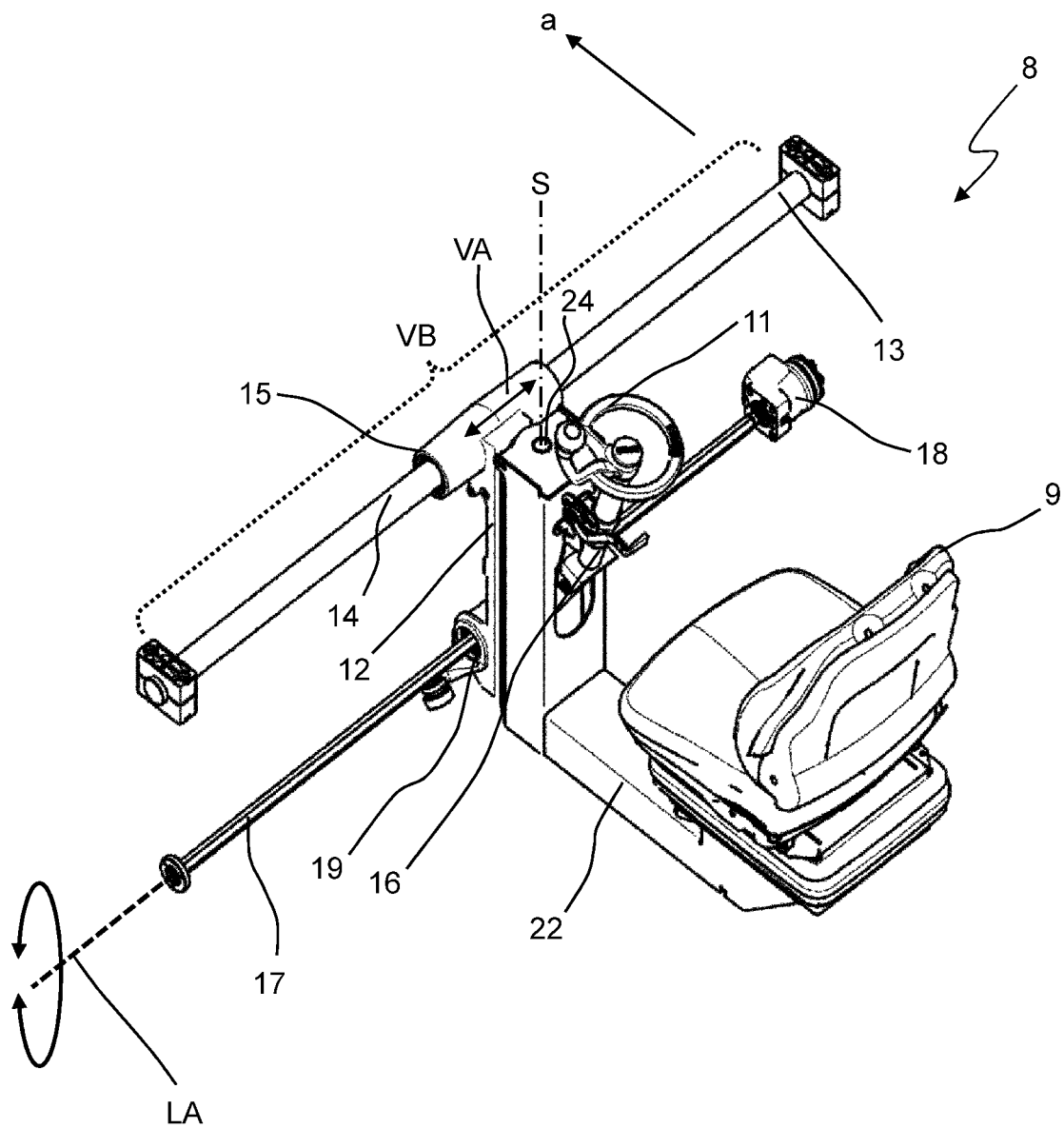
FIG. 3 is a perspective side view of an operator station of a road construction machine obliquely from an elevated rear position.

FIGS. 1 and 2 show road construction machines 1, specifically a road paver (FIG. 1) and a road roller of the tandem roller type (FIG. 2). The road construction machines 1 have a machine frame 3, an operator platform 2 and a travel mechanism. The road construction machine 1 is operated from the operator platform 2. The travel mechanism comprises travel units 6, which in the case of the road paver of FIG. 1 may be, for example, crawler tracks or wheels. In the case of the road roller shown in FIG. 2, the travel units 6 may, for example, be configured as compacting drums or as a set of rubber wheels. Moreover, the road construction machines 1 comprise a drive motor 4 as primary drive unit, which may be, for example, an internal combustion engine, in particular a diesel engine, and/or an electric motor, and which provides drive energy for operating the road construction machine 1. In working operation, the road construction machines 1 move in or against the forward direction a over the underlying ground B and process it, for example by laying a material mat, in particular an asphalt mat, using the road paver or by compacting the ground using the tandem roller.

The road paver according to FIG. 1 has a material hopper 5 in which paving material is stored during operation. This paving material is then transported by the road paver to its rear, where it is distributed by a transverse distribution device such as a screw conveyor and smoothed and pre-compacted by a paving screed 7.

The road roller as shown in FIG. 2 can compact the ground statically by its own weight and optionally dynamically with the aid of one or more vibration excitation devices arranged in one or more of the compaction drums 6.

The road construction machines 1 have at least one operating device 8 in their operator platform 2, as described in more detail in FIGS. 3 to 6. Part of the operating device 8 is, among other things, an operator seat 9, from which an operator sitting in it can operate, among other things, a steering wheel for manually effecting steering commands. The operating device 8 may have an operating console 10, as shown in part in FIG. 1. Further details of an exemplary structure of the operating device 8 are provided in FIGS. 3 to 6.

In addition to the operator seat 9, the operating device 8 comprises the steering wheel 11 arranged in front of the operator seat in the direction of view of an operator seated in the operator seat 9, a support slide 12 and a transverse guide 13, in the present case for example with at least one guide rail 14, which at least predominantly absorbs the loads of the support slide 12 and the elements arranged on it and the operator seated in the operator seat. The steering wheel 11 may be arranged centrally to the operator seat 9, i.e., positioned in the middle of the width of the seat surface when the operator seat 9 and the steering wheel 11 are projected into a common vertical projection plane perpendicular to the direction of view of an operator sitting in the operator seat and looking straight ahead from it in the direction of the steering wheel. The support slide 12 is mounted on the transverse guide 13 so as to be movable, in particular linearly displaceable, within an adjustment range VB in the direction of a displacement axis VA and may, for example, have a bearing sleeve 15 for this purpose which, possibly comprising a roller bearing or the like, is displaceable on the guide rail 14 of the transverse guide 13, which in the present embodiment example is illustratively configured as a round tube. The transverse guide 13 may also comprise support and guide devices alternatively or in addition to the guide rail 14, for example with a polygonal cross-section and/or comprising several guide rails running parallel to each other, etc. The support slide 12 functionally represents a single- or multi-part support device on which an operator seat support device 22 is swivel-mounted about a swivel axis S via a joint device 24, which in turn forms the support structure for the steering wheel 12 and the operator seat 9. The support slide 12 thus forms the mechanical connection to the transverse guide 14. The opposing maximum displacement positions of the support slide 12, in particular its bearing sleeve 15, define two lateral end positions, for example a right and left lateral end position with respect to the forward direction a, which each define a maximum displacement position in the respective direction, for example due to a mechanical stop. Continuous or incremental adjustment may be provided within the adjustment range VB. The transverse guide 14 may be the device which, in contrast to a steering output shaft 17 described in more detail below, absorbs and supports the weight force resulting from the support slide 12 and the elements carried by the support slide 12, such as the operator seat 9, the steering wheel 11, the operator seated in the operator seat 9, etc., at least to a substantial extent.

A steering input shaft device 16 and the steering output shaft 17 are also part of the operating device 8. The steering output shaft 17 may run essentially parallel to the transverse guide 13 or to the displacement axis VA. In one embodiment, the steering output shaft 17 can be rotated about a steering output shaft axis LA, but is otherwise arranged stationary in the road construction machine 1, in particular relative to the machine frame 3. When the support slide 12 is displaced along the displacement axis VA on the transverse guide 13, the steering output shaft 17 is therefore not displaced as well, but the support slide 12 and the elements carried by the support slide 2, which are described in more detail below, are also moved along the steering output shaft 17 at the same time. The steering output shaft 17 may further have a support function for positioning the support slide 12, although the support function, i.e., the absorption of the weight force generated by the support slide, is preferably provided at least predominantly by the transverse guide 13. In one embodiment, the support slide 12 is mounted in a load-free manner relative to the steering output shaft 17, so that, in particular, no weight force components attributable to the support slide 12 and to the elements carried by the support slide 2, which are described in more detail below, are transmitted to the steering output shaft 17. The steering output shaft 17 may be connected, in particular on its end face and further, in particular, directly, to a hydraulic valve 18, via which, for example, a steering hydraulic circuit, in particular a hydraulic actuator of a steering device not shown in more detail in the figures, can be actuated, so that, for example, a steering system is provided overall, the steering inputs of which, specified by the operator via the steering wheel, are transmitted exclusively mechanically via the steering input shaft device 16 to the output of the steering output shaft 17. For the connection or mechanical transmission of movement or torque from the steering input shaft device 16 to the steering output shaft 17, a direction change transmission 19 may be provided, as disclosed, for example, in DE 10 2010 035 270 B4. The direction change transmission 19 may, for example, be a cross-helical gearbox with a pinion 20 and a helical gear 21 in mesh with it, whose axes of rotation are offset by 90°. The helical gear 21 can be arranged on the steering output shaft 17 in a co-rotating manner, for which purpose the steering output shaft 17 may be a splined or polygonal shaft with a non-circular cross-sectional profile, for example. The hub of the helical gear 21 may be configured to complement the non-circular cross-sectional profile, so that the gear 21 can be displaced along the longitudinal axis of the steering output shaft 17, but at the same time there is a positive fit between the gear 21 and the steering output shaft 17 with regard to rotation about the longitudinal axis.

The support slide 12 thus also forms a bearing part to which an operator seat support device 22 is swivel-mounted about a swivel axis S via a joint device 24. The joint device 24, for example comprising a first rotary joint 24a and a second rotary joint 24b, is configured such that the operator seat support device 22 is rotatable relative to the support slide 12 about the swivel axis S, in particular extending in the vertical direction, so that the operator seat support device 22, on which the operator seat 9 and the steering wheel 11 are arranged, is not only displaceable relative to the support slide 12, which is arranged directly on the transverse guide 13, but can now also be swiveled. For this purpose, the joint device 24 may comprise several individual joints, in particular spaced apart from one another along the swivel axis S, such as, for example, the upper swivel joint 24a and the lower swivel joint 24b (FIG. 5) in the present embodiment, which are positioned coaxially on the swivel axis S with respect to their axes of rotation. This makes it possible not only to move the operator seat 9 and the steering wheel 11 together along the displacement axis VA in the horizontal plane, but also to swivel the operator seat 9 together with the steering wheel 11 in, for example, the horizontal plane about the swivel axis S, which in the present embodiment runs in vertical direction.

In the present embodiment, the swivel axis S and the displacement axis VA are skewed relative to each other and are spaced apart, for example, when viewed in the forward direction a. In terms of the actual configuration, however, there is a wide range of possible design variations, which may, for example, even mean that the two axes intersect in a virtual reference plane running in the vertical direction and in the direction transverse to the displacement axis or are at the same height when viewed in the forward direction a.

Figure 4:
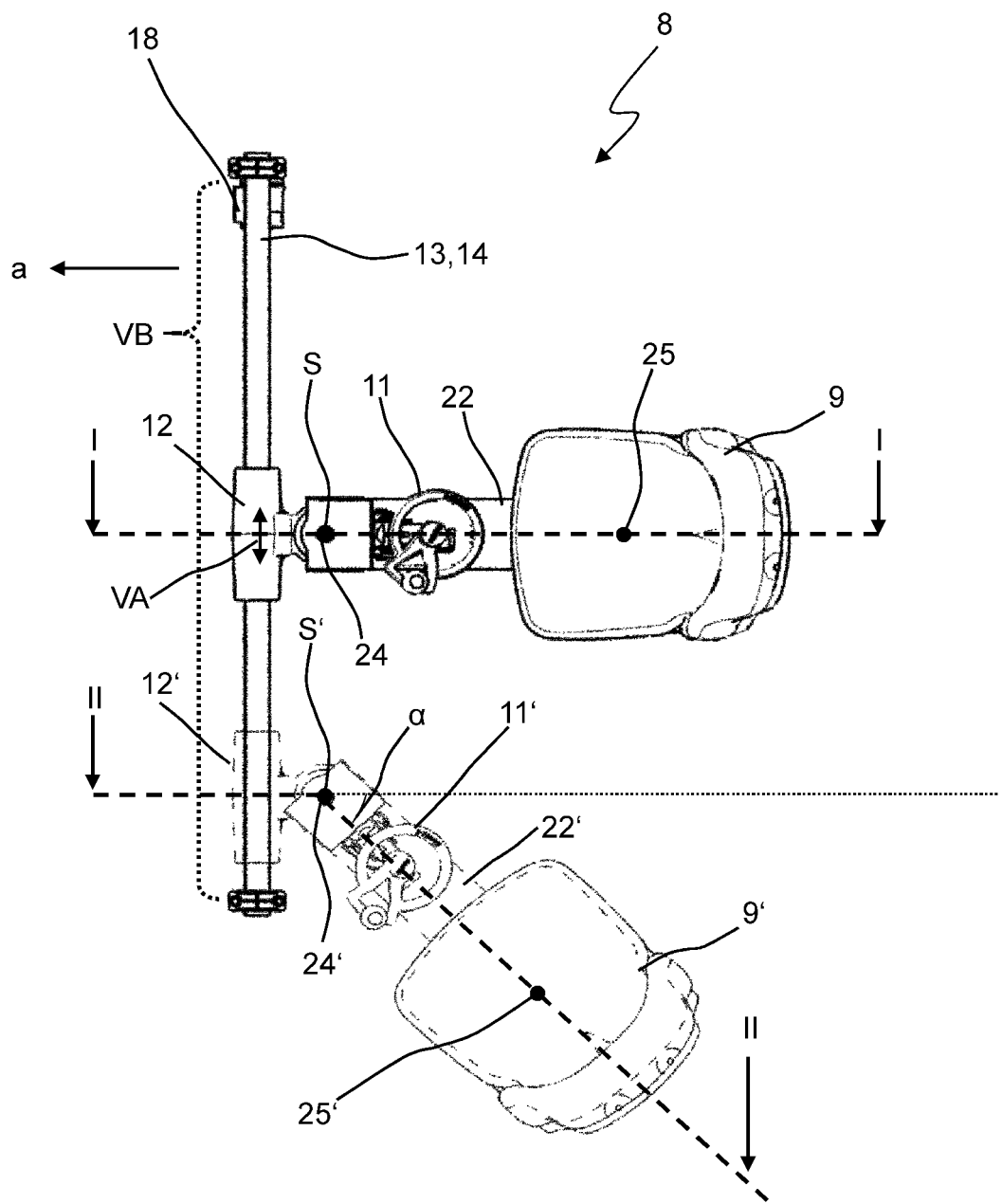
FIG. 4 is a top view of the operator unit of FIG. 3 with various swivel and displacement positions.

The range of functions that can be achieved with the arrangement according to the invention is illustrated in more detail in FIG. 4, for example. A first position of the support slide 12 is shown with solid lines, in which it is shown essentially in the center with respect to the adjustment range VB along the displacement axis VA and looking in the forward or working direction a from the operator seat 9. An alternative position is shown in dashed lines in FIG. 4, with the corresponding reference numerals in this figure being marked with " ". The support slide 12 has been displaced to the side along the displacement axis VA within the adjustment range VB (in this example, specifically to the left when viewed in the forward direction a). In addition, the operator seat support device 22 has been swiveled clockwise relative to the support slide 12 about the swivel axis S by the swivel angle α, the swivel angle being measured in a virtual, in particular horizontal, reference plane which is perpendicular to the swivel axis S. It is possible for the operator seat 9 to be swiveled out so far in the direction of displacement that its seat index point 25, in particular, also protrudes beyond the transverse guide 13 and even at least partially beyond an outer side wall of the respective road construction machine 1. The seat index point 25 is defined in the EN ISO 5353 standard. The standard also specifies a method for clearly determining the exact position of the seat index point SIP for any seat, to which reference is hereby made. The seat index point SIP is located approximately in the middle of the seat, a few centimeters above the seat surface. More detailed information can be found in the EN ISO 5353 standard.

It will be appreciated that the present embodiment example is configured such that the operating seat 9 can also be moved to the right-hand side and can also be swiveled out to the right-hand side. Furthermore, the displacement function of the operator seat 9 with the support slide 12 and the swivel function of the operator seat support device 22 or of the operator seat 9 relative to the support slide 12 are not positively coupled to specific relative positions to one another, but can be implemented independently of one another within the scope of their respective adjustment ranges. For example, it is advantageous if the operating device 8 as a whole is configured such that the operator seat 9 and the steering wheel 11 or the operator seat support device 22 can also be swiveled about the swivel axis S from the centrally aligned position shown with a solid line in FIG. 4 and are swiveled without it being necessary to move the support slide 12 along the displacement axis VA and to reach one of the two end positions along the displacement axis VA and vice versa.

Figure 5:
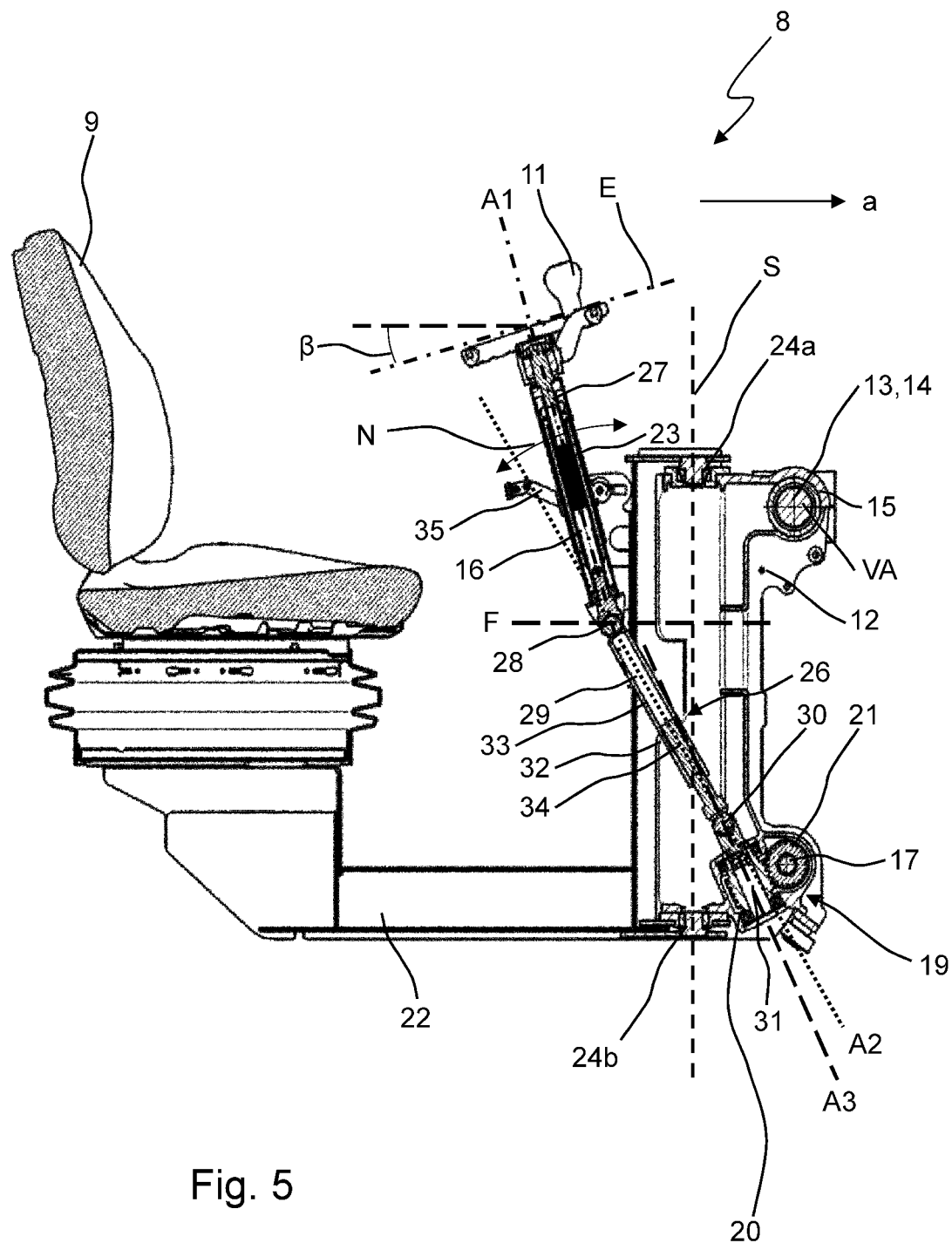
FIG. 5 is a sectional view along the lines I-I of FIG. 4.
Figure 6:
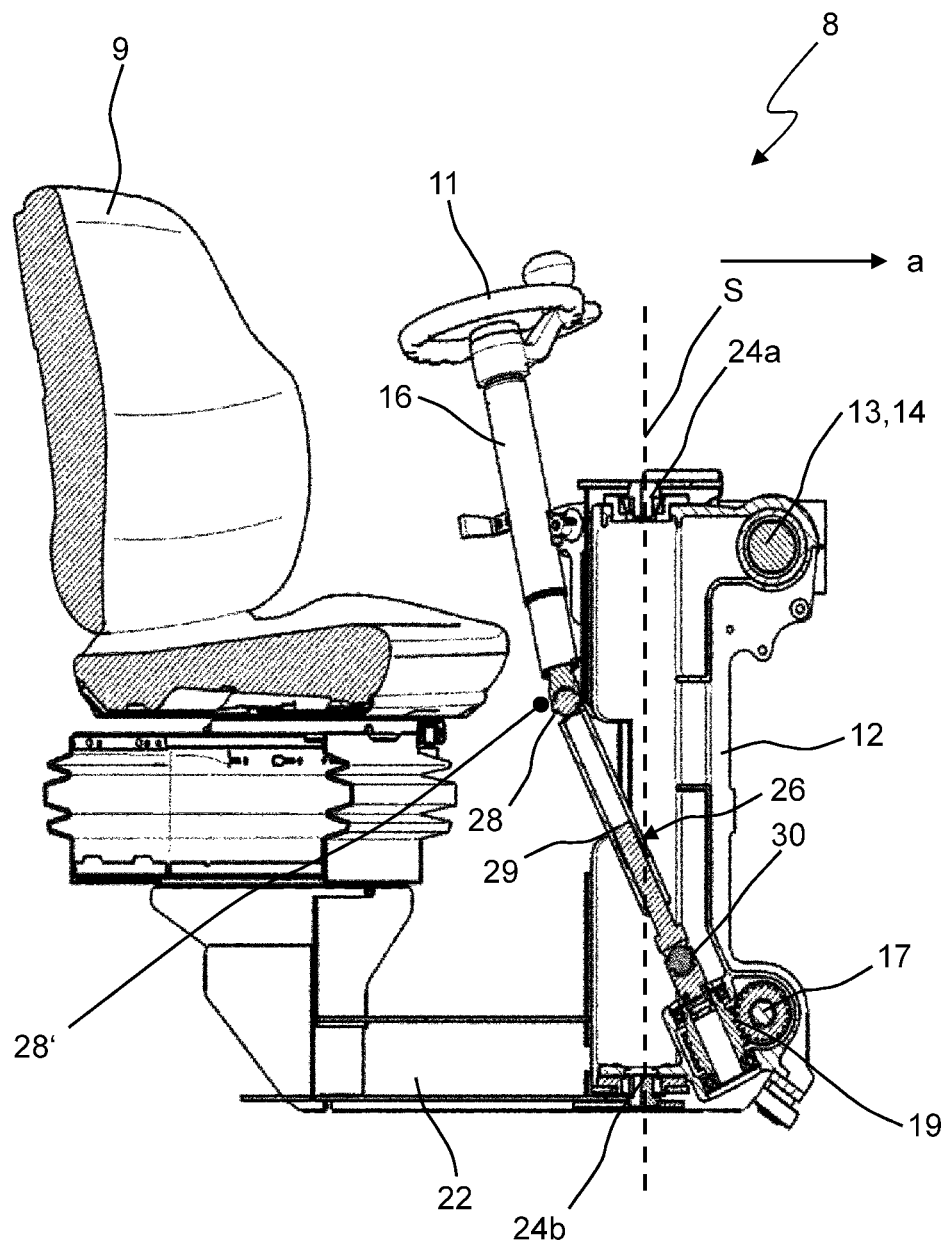
FIG. 6 is a sectional view along line II-II of FIG. 4.

FIG. 5 is a cross-sectional view of a section along line I-I in FIG. 4 (i.e., with the operator seat 9 on the support slide 12 oriented straight ahead in the forward direction a) and FIG. 6 is a cross-sectional view of a section along line II-II in FIG. 4 (i.e., with the operator seat 9 swiveled out relative to the support slide 12). A comparison of FIGS. 5 and 6 with one another illustrates the mode of operation of a length compensation device 26 included in the steering input shaft device 16 as well as further details of a possible structure of the steering input shaft device 16.

In the present embodiment example, the steering input shaft device 16 coming from the steering wheel 11 comprises a steering shaft 27 rotatable about a steering shaft axis A1, a second universal joint 28, a connecting shaft 29 rotatable about a connecting shaft axis A2, a first universal joint 30 and an input shaft 31 of the direction change transmission 19 rotatable about an input shaft axis A3. As shown in the present embodiment example, the length compensation device 26 may be configured as a telescopic device 32 with a shaft sleeve 33 and a shaft rod 34 engaging in a form-locking and co-rotating manner in the shaft sleeve 33 in the circumferential direction relative to the longitudinal axis. The telescopic device 26 is configured such that its extension in the direction of its longitudinal axis is variable at least within an adjustment range, for example by at least 5 mm, by displacing the shaft sleeve 33 relative to the shaft rod 34 along their common axis of rotation (in the present embodiment example the axis of rotation A2) and while maintaining the co-rotation with each another. The length compensation device 26 may, for example, be arranged between the second universal joint 28 and the first universal joint 30 as seen in the direction of the longitudinal extension of the steering input shaft device. Specifically, the length compensation device 26 may thus be used to vary the distance between the two universal joints 28 and 30 while maintaining the ability to transmit a torque through the steering input shaft device 16 within a compensation range. The compensation range thus refers specifically, for example, to the difference between the maximum and minimum distance between the two universal joints 28 and 30, which occurs in the various swivel positions of the operator seat relative to the transverse guide and/or of the support part relative to the bearing part.

In FIG. 5, it can be seen along the sectional line I-I that the shaft axes A1, A2 and A3 are not coaxial to each other, but are at an angle to each other in the sectional plane. These angles can be varied as a function of one another by means of an adjustment device 35, with which the angle β of a steering wheel plane E can be adjusted relative to a virtual horizontal reference plane or the inclination N of the steering shaft axis A1. In particular, the adjustment device 35 is configured such that the axis of rotation of the steering shaft axis A1 runs through a universal joint, for example the first universal joint 28 in the present case, when the inclination of the steering wheel is adjusted. The universal joint 28 thus has a dual function in this case, since it not only represents the joint of the steering input shaft device 16 for the inclination adjustment, but is also involved in adapting the steering input shaft device 16 to different swivel positions of the operator seat support device 22 about the swivel axis S relative to the support slide 12. By definition, the steering wheel plane E extends perpendicular to the axis of rotation of the steering wheel 11, in the present embodiment example therefore perpendicular to the steering shaft axis A1. Specifically, it is therefore possible to use the adjustment device 35 to swivel the steering wheel 11 closer towards the transverse guide 13 or to swivel it away from the transverse guide 13.

If the operator seat support device 22 is swiveled about the swivel axis S, as shown in FIG. 6, for example, the axes A1, A2 and A3 no longer run in a common vertical plane, but in different vertical planes that intersect one another. Furthermore, the distance between the steering wheel 11 and the direction change transmission 19, in particular the distance between the steering wheel 11 and the direction change transmission 19 or the steering output shaft 17 projected in a virtual horizontal reference plane, changes. The specific points of the steering wheel 11 and the direction change transmission 19 that are used here to reference the change in distance may vary. For example, for the steering wheel 11 this can be a point on the outer surface of the steering wheel through which the steering shaft axis A1 runs, and for the direction change transmission 19 it can be a point of intersection of the input shaft axis A3 with a virtual connecting line running perpendicular to the steering output shaft axis LA and the input shaft axis A3. While maintaining the possibility of transmitting the steering torque generated by the operator via the steering wheel 11 via the steering input shaft device 16 to the steering output shaft 1, this change in distance can now be compensated or equalized using the length compensation device 26 integrated into the power transmission line of the steering input shaft device 16, in this specific example for example by moving the shaft sleeve 33 relative to the shaft rod 34 along the connecting shaft axis A2, without the need for positional adjustments, for example to the steering wheel position relative to the operator seat 9 or the direction change transmission 19 relative to the steering output shaft 17.

To illustrate this in more detail, the position of the center of the second universal joint 28' from FIG. 5 is shown in FIG. 6. When the operator seat support device 22 is swiveled, the operator seat 9 and the steering wheel 11, among other parts, perform an arcuate movement about the swivel axis S in the horizontal plane. The second universal joint 28 also changes its relative position to the support slide 12. The first universal joint 30, on the other hand, is radially stationary relative to the support slide 12 and does not change its relative position. The intersection of the axes A1 and A2 defines a hinge point of the second universal joint 28 and the intersection of the axes A2 and A3 defines a hinge point of the first universal joint 30. A comparison of FIGS. 5 and 6 makes it clear that the hinge point of the first universal joint 30 retains its relative position to the direction change transmission 19, in particular for example its housing, when the operator seat support device 22 is swiveled about the swivel axis S. The first universal joint is thus mounted on the direction change transmission 19 such that its hinge point is stationary relative to the direction change transmission 19, in particular its housing. The situation is different with the hinge point of the second universal joint 28. The latter is mounted such that when the operator seat support device 22 is swiveled about the swivel axis S, the hinge point of the second universal joint 28 moves in a horizontal plane F, which in the present embodiment runs perpendicular to the swivel axis S. In this plane F, the hinge point of the second universal joint 28 performs a movement along a curved path. The vertical distance of the plane F relative to the direction change transmission 19 or along the swivel axis S and/or the course of the curved path within the plane F may vary depending on the angle β of the steering wheel plane E or the inclination N of the steering shaft axis A1.

It should also be noted with regard to FIG. 6 that, for reasons of clarity, the steering wheel 11 and the part of the steering input shaft device 16 extending from the steering wheel 11 to the second universal joint 28 are not shown in section in this figure.

FIG. 5 further illustrates that when viewed in a horizontal reference plane in the forward direction, the first universal joint 30 is positioned in front of the swivel axis S, which in turn is positioned in front of the second universal joint 28. The two universal joints 28 and 30 are thus distributed about the swivel axis S. Furthermore, the steering output shaft 17 is arranged in front of the two universal joints 28 and 30 in this view. This makes it particularly easy to make the length compensation device 26 comparatively compact.

A further functionality of the operating device 8 described in more detail in the figures, which is independent of the above explanations of the specific embodiment example, is again shown in FIG. 5. Accordingly, the steering input shaft device 16 comprises a telescopic device 23 in the region between the second universal joint 28 and the steering wheel 11, which is configured such that the steering wheel 11 is adjustable along the axis A1, in other words practically adjustable in height. However, the length variability existing at this point is functionally independent from the length compensation described above when swiveling the operator seat support device 22 about the swivel axis S. In relation to the steering input shaft device 16, however, it is therefore possible that two devices for changing the length of the steering input shaft device 16 are provided.

While the present invention has been illustrated by description of various embodiments and while those embodiments have been described in considerable detail, it is not the intention of the Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A road construction machine for working a ground in a forward direction (a), comprising:
   a machine frame,
   an operator platform,
   at least one travel unit, and
   an operating device arranged on the operator platform,
   the operating device comprising:
   an operator seat for an operator of the road construction machine, and
   a steering wheel for the operator to enter steering inputs,
   wherein the operating device is adjustable along a transverse guide using a support slide,
   wherein the support slide is adjustably mounted on the transverse guide such that it can be displaced together with the operator seat and the steering wheel along the transverse guide within an adjustment range (VB) between at least two different lateral end positions,
   wherein a steering input shaft device is provided, which is carried along the transverse guide when the support slide is displaced and is coupled to a steering output shaft which is arranged stationary on the road construction machine and extends parallel to the transverse guide,
   wherein further a direction change transmission is provided, which transmits the steering movements applied to the steering wheel from the steering input shaft device to the steering output shaft, wherein the direction change transmission is also carried along when the support slide is displaced, and is axially displaceable relative to the steering output shaft,
   wherein the steering input shaft device connects the steering wheel to the direction change transmission,
   wherein an operator seat support device is arranged on the support slide, which is connected to the support slide such that it can swivel about a swivel axis(S) via a joint device, so that the operator seat and the steering wheel are configured to swivel relative to the support slide about the swivel axis(S), and in that the steering input shaft device comprises a length compensation device,
wherein the steering input shaft device comprises a first universal joint and a second universal joint, which are arranged in series with one another, and
wherein when projected into a horizontal reference plane, the first universal joint is located in front of the swivel axis(S) when viewed in the forward direction (a) of the road construction machine, and the second universal joint is located behind the swivel axis(S) when viewed in the forward direction (a).

2. The road construction machine according to claim 1, wherein the length compensation device has a telescopic device which is configured to be adjusted within a compensation range.

3. The road construction machine according to claim 1, wherein the length compensation device is configured to co-rotate in the radial direction relative to the longitudinal axis of a length compensation region of the length compensation device.

4. The road construction machine according to claim 1, wherein the steering input shaft device comprises a flexible shaft.

5. The road construction machine according to claim 1, wherein the length compensation device is arranged between the first and the second universal joint.

6. The road construction machine according to claim 1, wherein when the steering input shaft device is projected into a horizontal reference plane, the steering output shaft and/or the guide rail and/or the direction change transmission are positioned in front of the first and the second universal joint as viewed in a forward direction (a) of the road construction machine.

7. The road construction machine according to claim 1, wherein the direction change transmission comprises an input shaft rotatable about an input shaft axis, the input end of which is connected to the first universal joint, in that the first and second universal joints are connected to one another by a connecting shaft rotatable about a connecting shaft axis, and in that the steering wheel is connected to the second universal joint via a steering shaft rotatable about a steering shaft axis.

8. The road construction machine according to claim 1, wherein the operator seat support device comprises an adjustment device configured such that the inclination of the steering wheel can be adjusted.

9. The road construction machine according to claim 8, wherein the adjustment device and the steering input shaft device are configured such that the steering shaft can be positioned coaxially with respect to its axis of rotation relative to the axis of rotation of the input shaft.

10. The road construction machine according to claim 1, wherein the road construction machine comprises a road paver or a tandem roller.

11. The road construction machine according to claim 1, wherein the angle of adjustment of the operator seat support device relative to the support slide about the swivel axis(S) between two maximum end positions is at least 90°.

12. The road construction machine according to claim 11, wherein the angle of adjustment of the operator seat support device relative to the support slide about the swivel axis(S) between two maximum end positions is at least 120°.

13. The road construction machine according to claim 11, wherein the angle of adjustment of the operator seat support device relative to the support slide about the swivel axis(S) between two maximum end positions is a maximum of 180°.

14. The road construction machine according to claim 11, wherein the angle of adjustment of the operator seat support device relative to the support slide about the swivel axis(S) between two maximum end positions is a maximum of 160°.

* * * * *